(12) United States Patent
Zhang et al.

(10) Patent No.: US 11,969,733 B1
(45) Date of Patent: Apr. 30, 2024

(54) PRODUCTION DEVICE FOR PREPARING BUILDING MATERIAL USING FINE PARTICLE SILT IN IRON TAILINGS

(71) Applicant: Nanjing Institute of Environmental Sciences, MEE, Nanjing (CN)

(72) Inventors: Houhu Zhang, Nanjing (CN); Bing Ma, Nanjing (CN); Hao Zhou, Nanjing (CN); Yuanshun Xu, Nanjing (CN); Guodong Kang, Nanjing (CN); Yi Wang, Nanjing (CN); Xiaowei Xu, Nanjing (CN)

(73) Assignee: Nanjing Institute of Environmental Sciences, MEE, Nanjing (CN)

( * ) Notice: Subject to any disclaimer, the term of this patent is extended or adjusted under 35 U.S.C. 154(b) by 0 days.

(21) Appl. No.: 18/394,957

(22) Filed: Dec. 22, 2023

(30) Foreign Application Priority Data

Apr. 7, 2023 (CN) .......................... 202310363770.1

(51) Int. Cl.
*B02C 17/07* (2006.01)
*B02C 17/20* (2006.01)
*B02C 23/04* (2006.01)

(52) U.S. Cl.
CPC .............. *B02C 17/07* (2013.01); *B02C 17/20* (2013.01); *B02C 23/04* (2013.01)

(58) Field of Classification Search
CPC ......... B02C 17/07; B02C 17/20; B02C 23/04; B02C 2015/008; B02C 15/00; B02C 15/001; B02C 15/004; B02C 15/005; B02C 15/007; B02C 15/006
See application file for complete search history.

(56) References Cited

FOREIGN PATENT DOCUMENTS

| CN | 211247267 U | | 8/2020 |
|----|-------------|---|--------|
| CN | 211563173 U | | 9/2020 |
| CN | 212856095 U | | 4/2021 |
| CN | 215743920 U | | 2/2022 |
| CN | 114130481 A | | 3/2022 |
| CN | 216063647 U | * | 3/2022 |
| CN | 216063647 U | | 3/2022 |
| CN | 114904622 A | * | 8/2022 |
| CN | 217594794 U | * | 10/2022 |
| CN | 217594794 U | | 10/2022 |
| CN | 218013098 U | | 12/2022 |
| CN | 115739271 A | | 3/2023 |
| FR | 1212889 A | | 3/1960 |

* cited by examiner

*Primary Examiner* — Bobby Yeonjin Kim
(74) *Attorney, Agent, or Firm* — Westbridge IP LLC (57) ABSTRACT

A production device for preparing a building material using a fine particle silt in iron tailings includes an operation desk and a grinding device. During movement of edge plates, gears are located inside a side groove and keep meshing with toothed grooves, the edge plates will drive various gears to rotate along a same direction and drive grinding balls and connecting shafts to rotate while moving, the grinding balls will perform grinding treatment on the fine particle silt at the inner end of the grinding cabinet while rotating.

3 Claims, 10 Drawing Sheets

PRODUCTION DEVICE FOR PREPARING BUILDING MATERIAL USING FINE PARTICLE SILT IN IRON TAILINGS

CROSS-REFERENCE TO RELATED APPLICATIONS

The application claims priority to Chinese Patent Application No. 202310363770.1, filed on Apr. 7, 2023, which is incorporated herein by reference in its entirety.

TECHNICAL FIELD

The present disclosure relates to the technical field of building material production, and in particular to a production device for preparing a building material using a fine particle silt in iron tailings.

BACKGROUND

Currently, with the development of the state building industry, the main reasons that most areas in China seldom use natural river sands as fine aggregates when preparing concretes are that: the natural river sand resource is limited, non-renewable in a short time and unfavorable to a long-distance transportation, excessive exploitation of the natural river sands results in increasing pressure on the natural environment, and replacing the natural river sand with the iron tailings sand to prepare the concrete has become an inevitable trend for sustainable development of concrete industries at home and abroad.

Compared with the natural river sand, the iron tailings sand has the disadvantages of rough particles, more corner angles, poor grading, more limestone powder content, breakage and the like, and phenomena such as separation, bleeding and poor workability easily occur to the concrete prepared using machine-made sand; the iron tailings sand is a particle formed by grinding and sorting an iron ore and having a particle size of being less than 4.75 mm, generally stacked in a tailings pond, and mainly composed of process solid wastes; and the iron tailings sand is a fine aggregate with a material performance approaching to the natural river sand, has a rough surface and more corner angles.

To cope with the foregoing issue, a production device for preparing a building material using a fine particle silt in iron tailings is urgently needed at present.

SUMMARY

The objective of the present disclosure is to provide a production device for preparing a building material using a fine particle silt in iron tailings, to solve the issue proposed in the background art.

To achieve the foregoing objective, a production device for preparing a building material using a fine particle silt in iron tailings is provided, including an operation desk, where the operation desk includes a fixed box, a through groove is formed in a bottom of an inner end of the fixed box, a grinding device is arranged at the inner end of the fixed box and includes a grinding cabinet, a plurality of leakage grooves are formed in a bottom end of the grinding cabinet and keep communicating with the through groove, both sides of the grinding cabinet are provided with edge plates, the two edge plates keep a sliding connection with both sides of a top end of the fixed box in respective, a side groove is formed in a side of each of the edge plates, a plurality of toothed grooves are formed in a top wall of the side groove, a plurality of grinding assemblies are arranged inside each of the edge plates, each of the grinding assemblies includes a connecting shaft, both sides of which keep a sliding connection with both sides of the side groove in respective and keep a rotating connection with both sides of each of the edge plates in respective, a plurality of grinding balls are serially connected on the connecting shaft, both ends of the connecting shaft are coaxially connected with gears, the gears keep meshing with the toothed grooves, both sides of the fixed box are provided with hydraulic rods, and tail ends of the hydraulic rods are connected with bottom ends of the edge plates.

As a further improvement of the technical solution, both sides of the inner end of the fixed box are provided with baffles which keep a sliding connection with the grinding cabinet, and keep a rotating connection with various connecting shafts.

As a further improvement of the technical solution, a wedge block is arranged at an inner end of the through groove, and two tilted grooves are formed between the wedge block and the through groove.

As a further improvement of the technical solution, a base plate is arranged at a middle position of a top end of the wedge block, a top groove is formed in a top end of the base plate, and a plurality of burrs are arranged at an inner end of the top groove.

As a further improvement of the technical solution, both sides of a bottom end of the through groove are provided with collecting cabinets, of which top ends are provided with collecting grooves, the collecting grooves keep communicating with the bottom end of the through groove, bottom ends of the collecting cabinets are provided with sliders which keep a sliding connection with the bottom end of the fixed box, and sides of the collecting cabinets are provided with handles.

As a further improvement of the technical solution, an arc-shaped groove is formed in a contact position between the bottom end of each of the edge plates and the top end of the fixed box, and an inner end of the arc-shaped groove is in rolling connection with a plurality of balls which keep a rolling connection with the top end of the fixed box.

As a further improvement of the technical solution, both sides of the top end of the grinding cabinet are provided with shields, and both shields are inclined to the middle position of the grinding cabinet.

As a further improvement of the technical solution, both sides of the top end of the fixed box are provided with top plates, a gap is reserved between the top plates and the top end of the fixed box, and the top ends of the edge plates slide along an inner end of the gap.

As a further improvement of the technical solution, both sides of the inner end of each of the top plates are provided with a pair of buffer springs, of which tail ends are connected with the sides of the edge plates.

Compared with the prior art, the present disclosure has the following beneficial effects.

Firstly, in the production device for preparing the building material using the fine particle silt in the iron tailings, the fine particle silt at the inner end of the grinding cabinet is driven to shake back and forth through the sliding of the grinding cabinet, so as to filter fine impurities in the fine particle silt and improve the purity of the building material prepared later, meanwhile during movement of the edge plates, the gears are located inside the side groove and keep meshing with the toothed grooves, the edge plates will drive various gears to rotate along a same direction and drive the grinding balls and the connecting shafts to rotate while moving, the grinding balls will perform grinding treatment on the fine particle silt at the inner end of the grinding cabinet while rotating, to grind and smooth the fine particle silt with rough particles and more corner angles and to further improve the quality of the fine particle silt, and during rotation, the grinding balls can quicken the shaking efficiency of the fine particle silt and improve the sieving speed of the fine impurities.

Secondly, in the production device for preparing the building material using the fine particle silt in the iron tailings, notches are subjected to sealing treatment through the set baffles, to ensure that the notches are always in a sealing state to prevent the fine particle silt splashing while the normal sliding of the grinding cabinet and the connecting shafts can be ensured.

Thirdly, in the production device for preparing the building material using the fine particle silt in the iron tailings, a contact area between the through groove and the fine particle silt is reduced through the set wedge block, such that a triangular structure is formed at the middle position of the through groove, and the contact area may be negligible, to prevent the accumulation of the fine impurities.

Lastly, in the production device for preparing the building material using the fine particle silt in the iron tailings, a contact area between the edge plates and the fixed box is reduced through the set balls, while the contact area is in direct proportion to a frictional resistance, so reducing the contact area can reduce the frictional resistance, thereby alleviating a sliding hinder of the frictional resistance to the edge plates.

DETAILED DESCRIPTION OF THE EMBODIMENTS

The technical solution in the embodiments of the present disclosure is clearly and completely elaborated below in combination with the drawings in the embodiments of the present disclosure. It is apparent that the described embodiments are only a part of the embodiments of the present disclosure but not all. Based on the embodiments of the present disclosure, all the other embodiments obtained by those of ordinary skill in the art on the premise of not contributing creative effort should belong to the protection scope of the present disclosure.

In the description of the present disclosure, it is understood that orientation or position relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", and the like are based on the orientation or position relationships as shown in the drawings, for ease of describing the present disclosure and simplifying the description only, rather than indicating or implying that the mentioned device or element necessarily has a particular orientation and must be constructed and operated in the particular orientation. Therefore, these terms should not be understood as limitations to the present disclosure.

Please refer to what is shown in FIG. 1-FIG. 10, a production device for preparing a building material using a fine particle silt in iron tailings is provided, including an operation desk 10, where the operation desk 10 includes a fixed box 110, a through groove is formed in a bottom of an inner end of the fixed box 110, a grinding device 20 is arranged at the inner end of the fixed box 110 and includes a grinding cabinet 210, a plurality of leakage grooves 211 are formed in a bottom end of the grinding cabinet 210 and keep communicating with the through groove, both sides of the grinding cabinet 210 are provided with edge plates 220, the two edge plates 220 keep a sliding connection with both sides of a top end of the fixed box 110 in respective, a side groove 221 is formed in a side of each of the edge plates 220, a plurality of toothed grooves 222 are formed in a top wall of the side groove 221, a plurality of grinding assemblies 230 are arranged inside each of the edge plates 220, each of the grinding assemblies 230 includes a connecting shaft 231, both sides of which keep a sliding connection with both sides of the side groove 221 in respective and keep a rotating connection with both sides of each of the edge plates 220 in respective, a plurality of grinding balls 232 are serially connected on the connecting shaft 231, both ends of the connecting shaft 231 are coaxially connected with gears 233, the gears 233 keep meshing with the toothed grooves 222, both sides of the fixed box 110 are provided with hydraulic rods 130, and tail ends of the hydraulic rods 130 are connected with bottom ends of the edge plates 220.

During specific use, firstly, the fine particle silt in the iron tailings is introduced into the inner end of the grinding cabinet 210, the hydraulic rods 130 push the edge plates 220 to slide back and forth along the top end of the grinding cabinet 210, the grinding cabinet 210 will drive the fine particle silt at the inner end of grinding cabinet 210 to shake back and forth during a sliding process, a thrust generated by shaking enables the fine particle silt to float up and down, at this time some fine impurities exist in the fine particle silt, for example, limestone powder will float up and down along the fine particle silt, when the limestone powder moves to the lowermost end, since an opening size of each of the leakage grooves 211 is greater than a particle size of the limestone powder, the limestone powder falls into the inner end of the through groove along the leakage grooves 211, so as to filter fine impurities in the fine particle silt and improve the purity of the building material prepared later, meanwhile during movement of the edge plates 220, the gears 233 are located inside the side groove 221 and keep meshing with the toothed grooves 222, the edge plates 220 will drive various gears 233 to rotate along a same direction and drive the grinding balls 232 and the connecting shafts 231 to rotate while moving, the grinding balls 232 will perform grinding treatment on the fine particle silt at the inner end of the grinding cabinet 210 while rotating, to grind and smooth the fine particle silt with rough particles and more corner angles and to further improve the quality of the fine particle silt, and during rotation, the grinding balls 232 can quicken the shaking efficiency of the fine particle silt and improve the sieving speed of the fine impurities.

Figure 2:
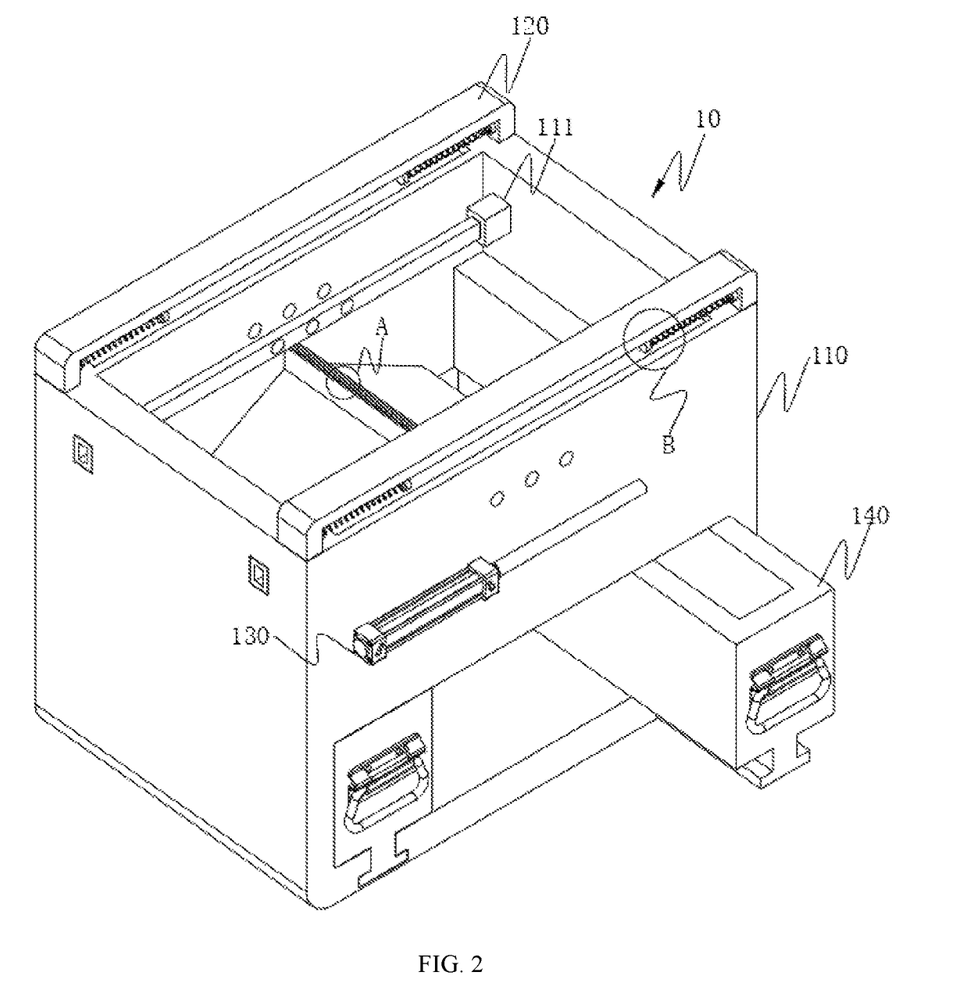
FIG. 2 is a structure split diagram of an operation desk of the present disclosure.
Figure 3:
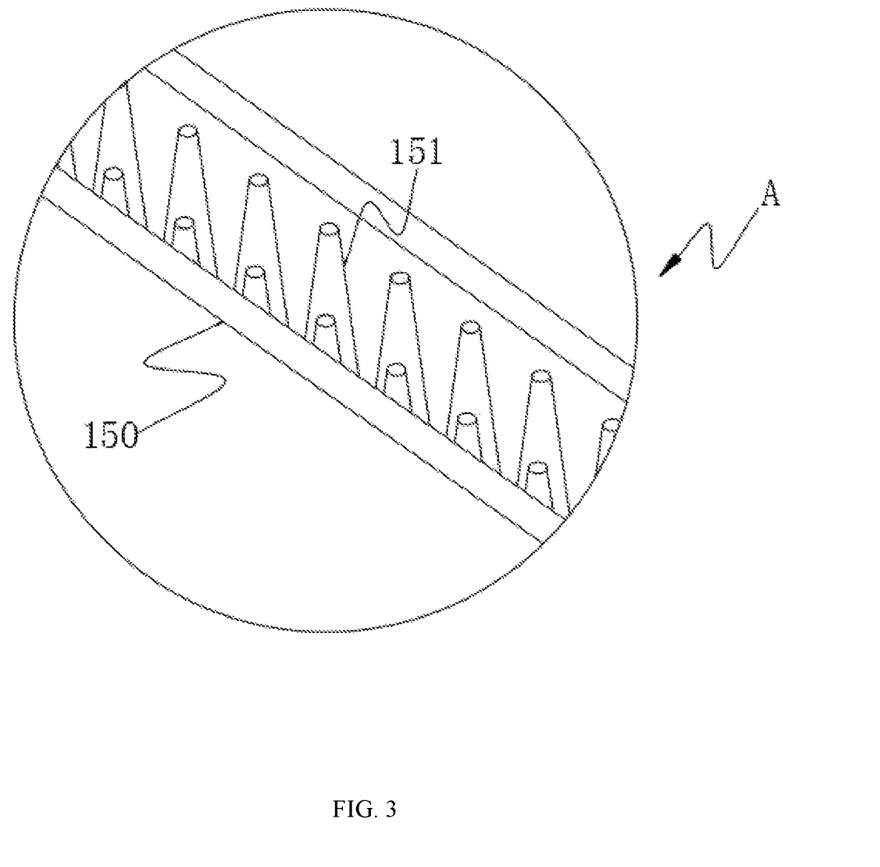
FIG. 3 is a local enlarged diagram of part A in FIG. 2 of the present disclosure.

Since the grinding cabinet 210 and the connecting shafts 231 need to keep a sliding connection, notches for the sliding of the connecting shafts 231 need to be arranged inside the grinding cabinet 210, sizes of the notches need to meet sliding paths of the connecting shafts 231, while the fine particle silt will splash during a shaking process, the splashing fine particle silt is easily discharged from the inner end of the grinding cabinet 210 along the notches, resulting in the waste of a great number of raw materials. Furthermore, both sides of the inner end of the fixed box 110 are provided with baffles 111 which keep a sliding connection with the grinding cabinet 210, and keep a rotating connection with various connecting shafts 231. The notches are subjected to sealing treatment through the set baffles 111, to ensure that the notches are always in a sealing state to prevent the fine particle silt splashing while the normal sliding of the grinding cabinet 210 and the connecting shafts 231 can be ensured.

Further, a wedge block is arranged at an inner end of the through groove, and two tilted grooves are formed between the wedge block and the through groove. During specific use, when the fine particle silt is sieved, the fine impurities will flow down along the through groove, if a contact surface between the through groove and the fine particle silt is great, a great number of fine impurities accumulate on the contact surface easily, so a blockage is easily caused to the through groove in the long run, to affect the collecting efficiency of the fine impurities; and a contact area between the through groove and the fine particle silt is reduced through the set wedge block, such that a triangular structure is formed at the middle position of the through groove, and the contact area may be negligible, to prevent the accumulation of the fine impurities.

Figure 4:
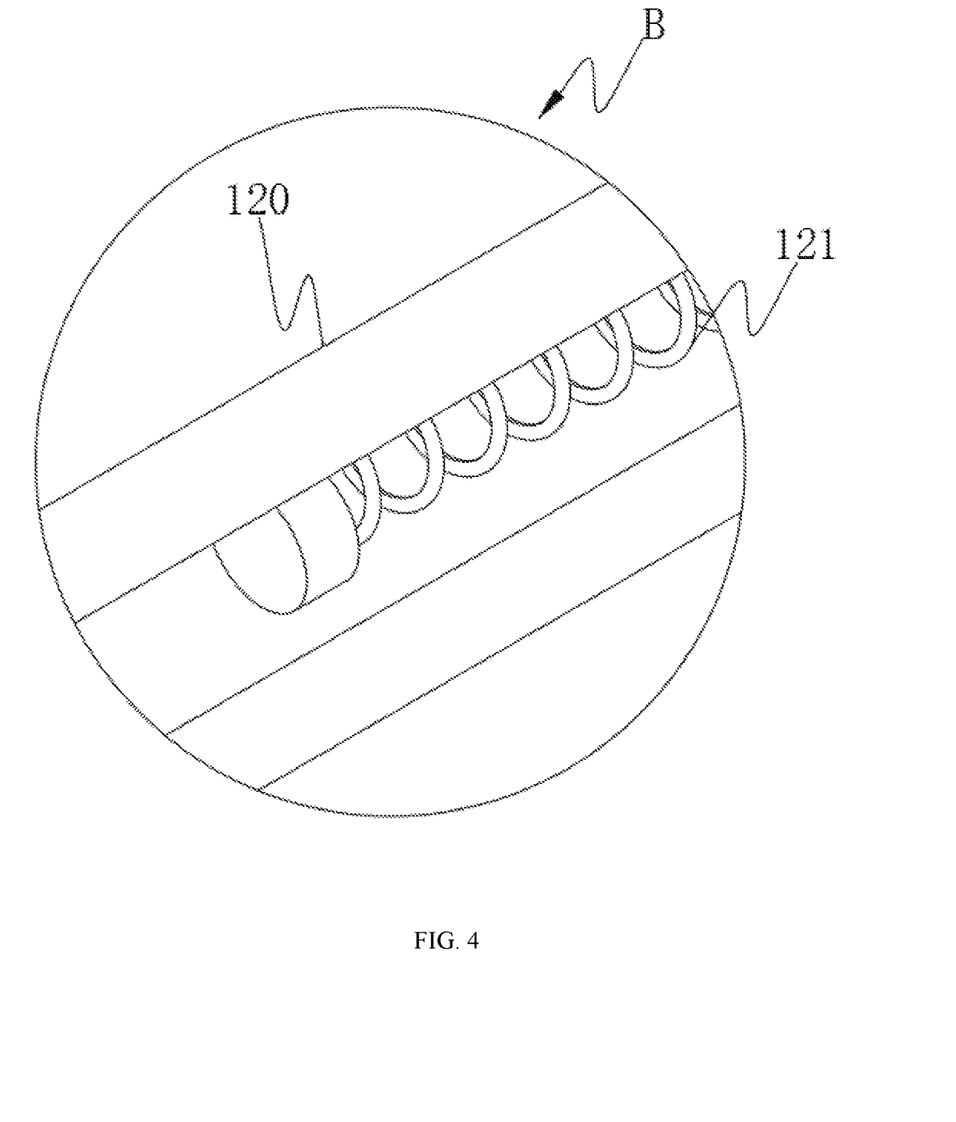
FIG. 4 is a local enlarged diagram of part B in FIG. 2 of the present disclosure.

Further again, a base plate 150 is arranged at a middle position of a top end of the wedge block, a top groove is formed in a top end of the base plate 150, and a plurality of burrs 151 are arranged at an inner end of the top groove. During specific use, when the grinding cabinet 210 slides back and forth along the inner end of the fixed box 110, the base plate 150 is located right below the grinding cabinet 210, and top ends of the burrs 151 are in contact with the bottom end of the grinding cabinet 210 to scratch the inner sides of the leakage grooves 211 back and forth, such that the leakage grooves 211 with the blockage during the sieving process are dredged, thereby further improving the sieving efficiency.

Figure 5:
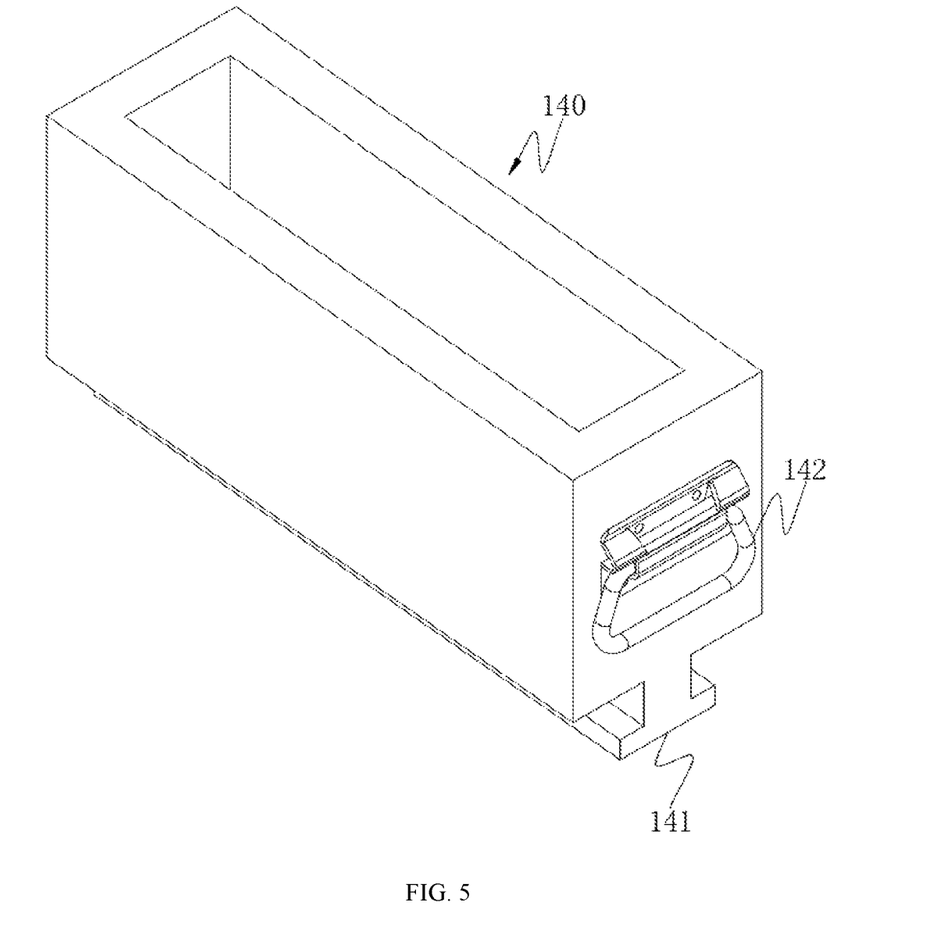
FIG. 5 is a structure schematic diagram of a collecting cabinet of the present disclosure.

Since the inner end of the through groove has a limited space, the accumulation of excess fine impurities easily causes the blockage of the through grooves, specifically, both sides of a bottom end of the through groove are provided with collecting cabinets 140, of which top ends are provided with collecting grooves, the collecting grooves keep communicating with the bottom end of the through groove, bottom ends of the collecting cabinets 140 are provided with sliders 141 which keep a sliding connection with the bottom end of the fixed box 110, and sides of the collecting cabinets 140 are provided with handles 142; and the fine impurities accumulated in the inner end of the through groove are exported in time through the set collecting cabinets 140, at this time the collecting cabinets 140 are indirectly driven to separate from the bottom end of the fixed box 110 by pulling the handles 142, such that the collected fine impurities are discharged in time for secondary collection.

Figure 7:
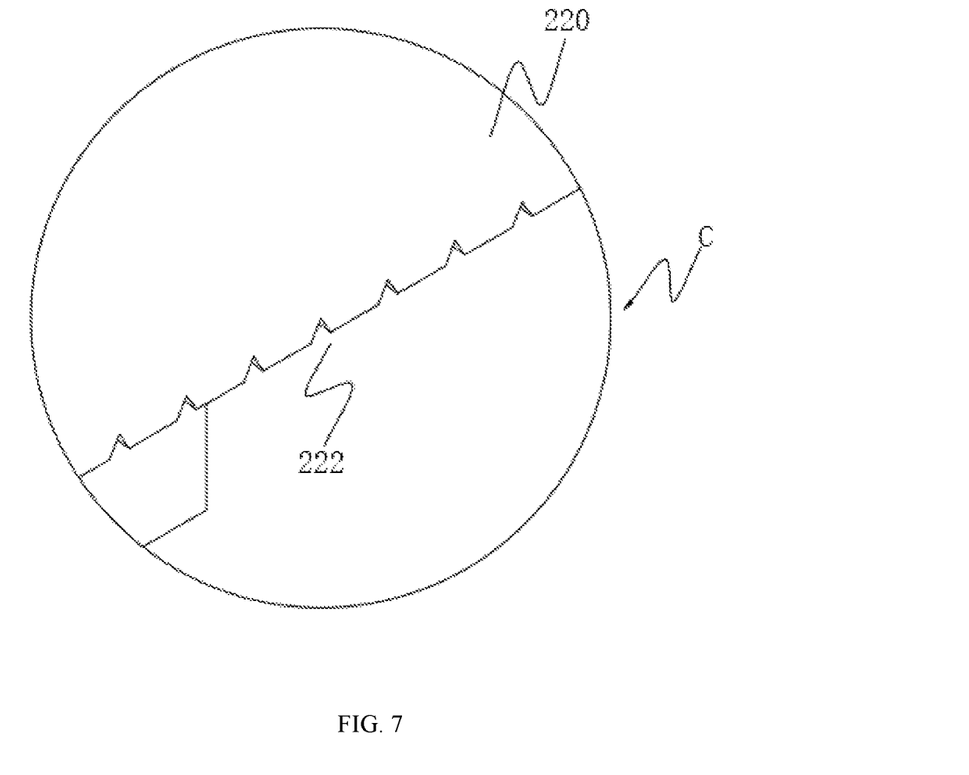
FIG. 7 is a local enlarged diagram of part C in FIG. 6 of the present disclosure.
Figure 9:
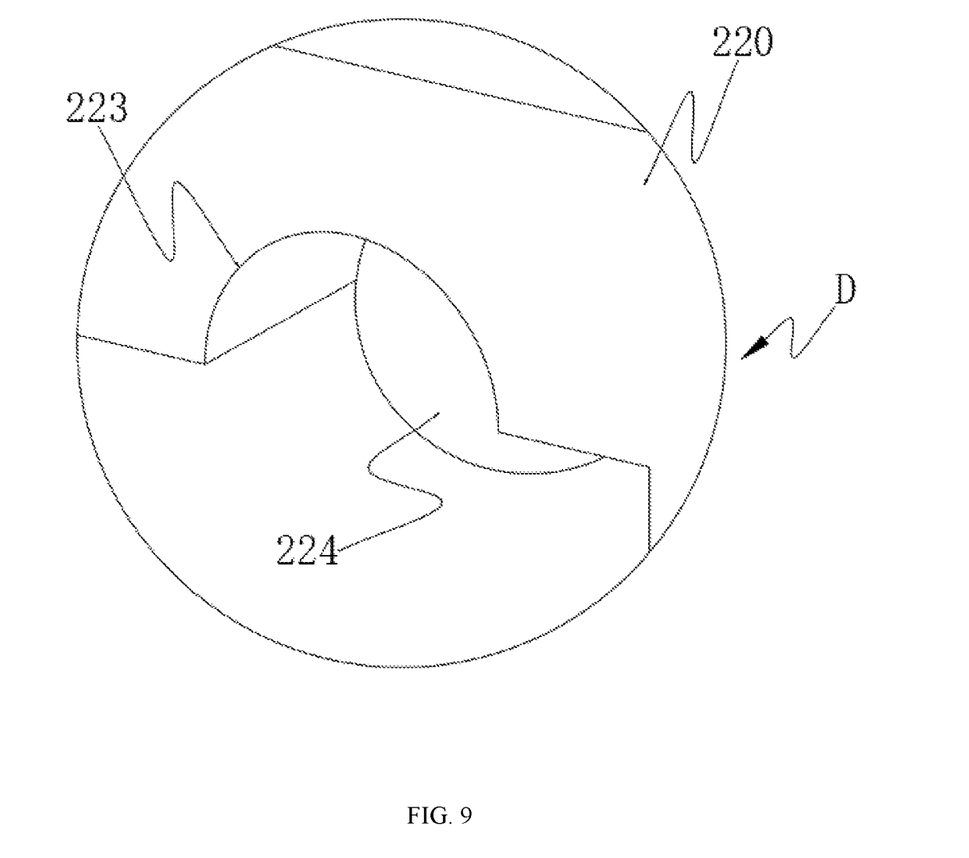
FIG. 9 is a local enlarged diagram of part D in FIG. 8 of the present disclosure.
Figure 10:
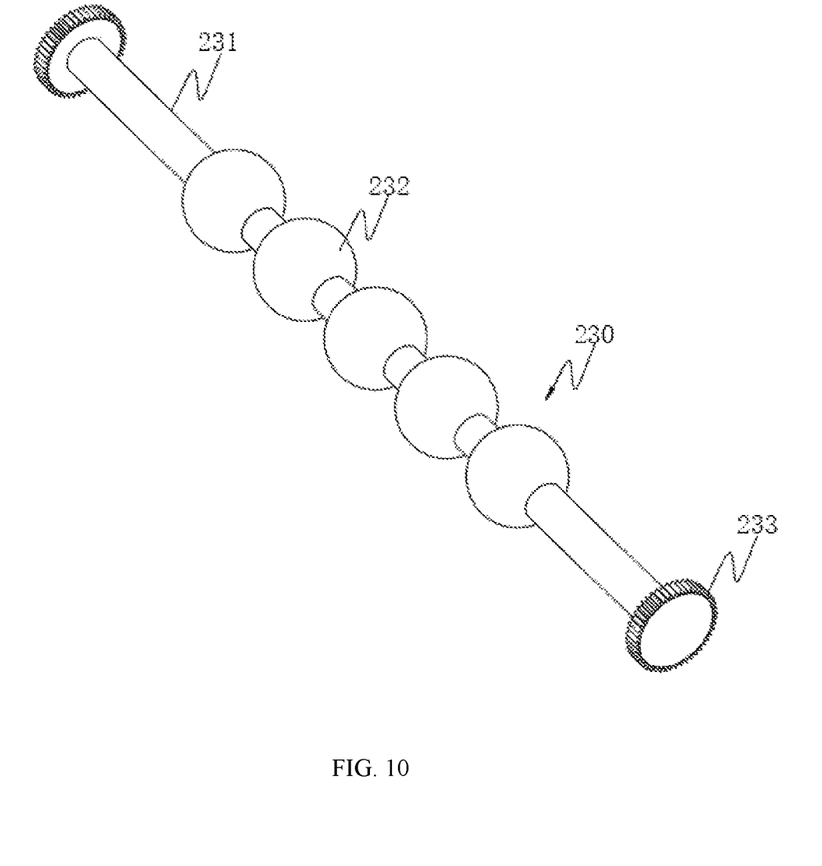
FIG. 10 is a structure schematic diagram of a grinding assembly of the present disclosure.

Since a frictional resistance will generate at contact positions of the edge plates 220 during a process of sliding along the top end of the fixed box 110, a direction of the frictional resistance is always opposite to sliding directions of the edge plates 220, which hinders the normal sliding of the edge plates 220, particularly the position that the bottom ends of the edge plates 220 are in mutual contact with the top end of the fixed box 110, and at this time self-gravity of the edge plates 220 acts on the top end of the fixed box 110 directly, such that the frictional resistance is further improved. Furthermore, an arc-shaped groove 223 is formed in a contact position between the bottom end of each of the edge plates 220 and the top end of the fixed box 110, and an inner end of the arc-shaped groove 223 is in rolling connection with a plurality of balls 224 which keep a rolling connection with the top end of the fixed box 110. A contact area between the edge plates 220 and the fixed box 110 is reduced through the set balls 224, while the contact area is in direct proportion to the frictional resistance, so reducing the contact area can reduce the frictional resistance, thereby alleviating a sliding hinder of the frictional resistance to the edge plates 220.

Figure 6:
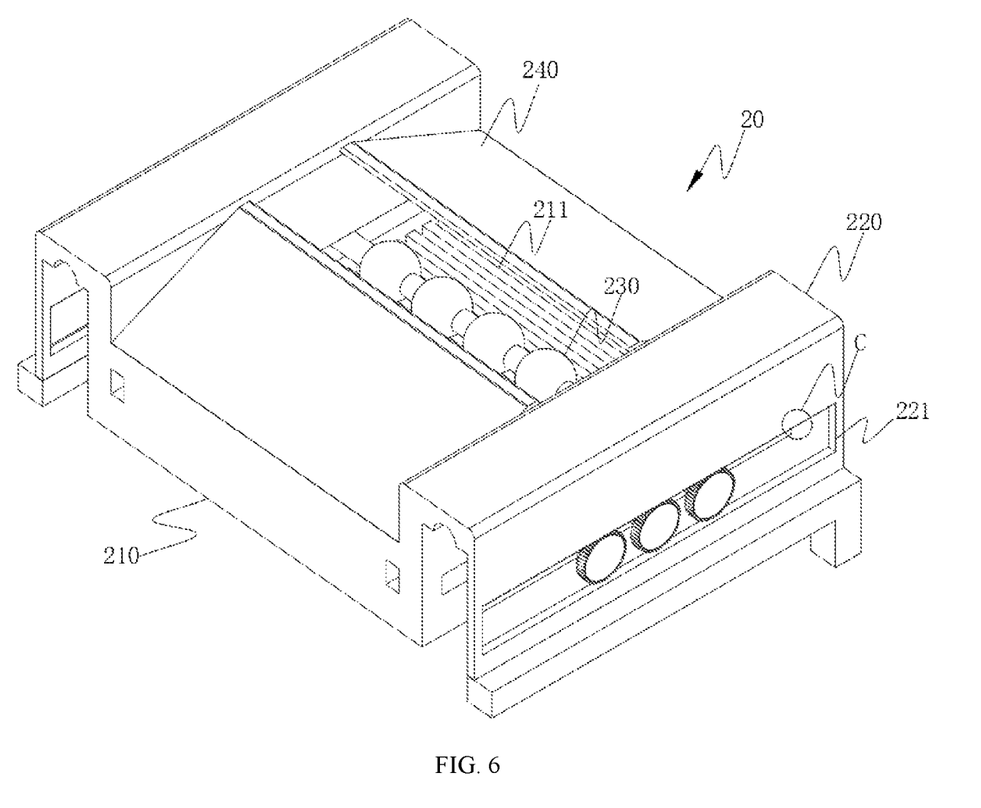
FIG. 6 is a structure schematic diagram I of a grinding device of the present disclosure.
Figure 8:
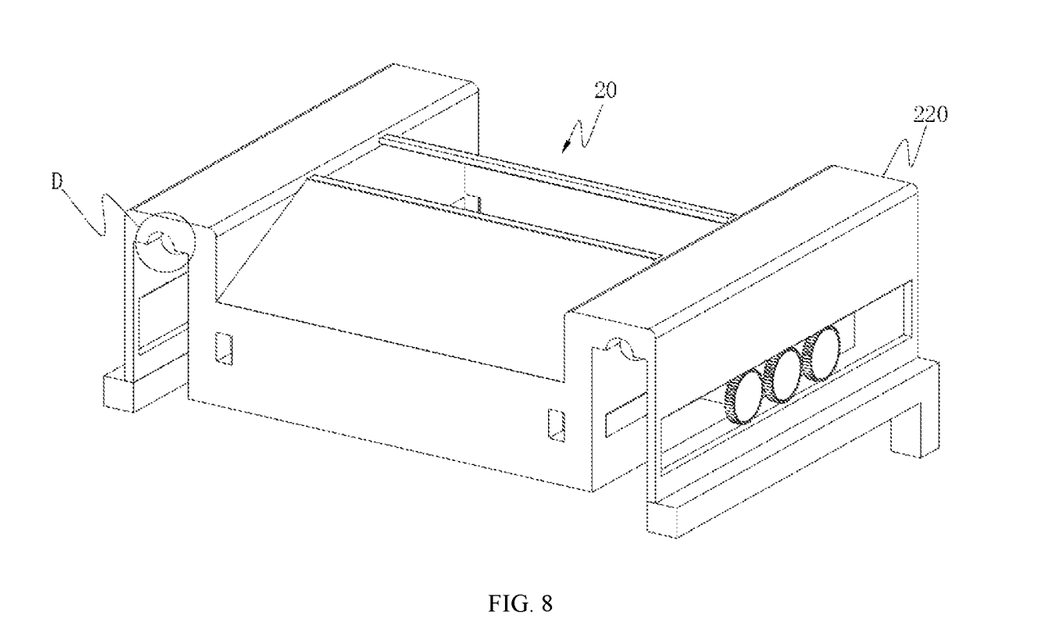
FIG. 8 is a structure schematic diagram II of a grinding device of the present disclosure.

Further, both sides of the top end of the grinding cabinet 210 are provided with shields 240, and both shields 240 are inclined to the middle position of the grinding cabinet 210. During specific use, both sides of the top end of the grinding cabinet 210 are protected through the set shields 240, to prevent the splashing fine particle silt from splashing out of the top end of the grinding cabinet 210, to reduce the waste of the raw material during production, and at the same time the splashing fine particle silt can be prevented from hitting operators during working.

Figure 1:
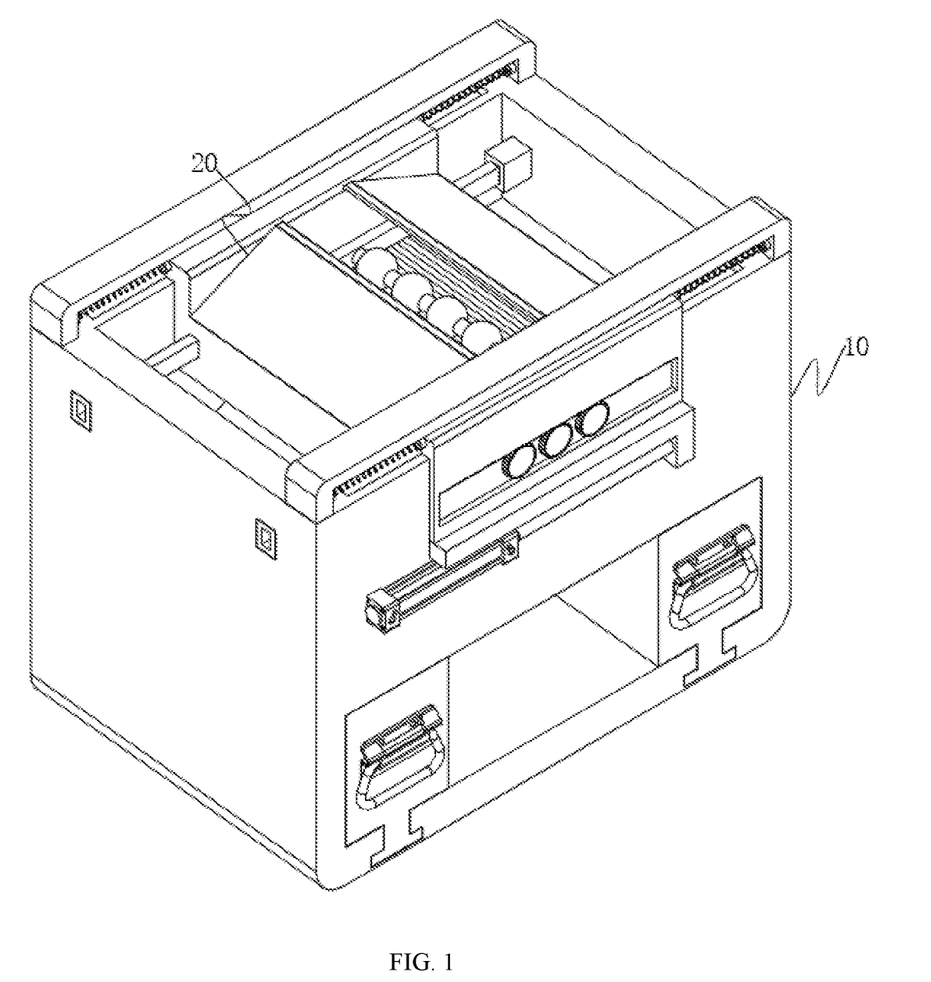
FIG. 1 is a schematic diagram of an overall structure of the present disclosure.

Further again, both sides of the top end of the fixed box 110 are provided with top plates 120, a gap is reserved between the top plates 120 and the top end of the fixed box 110, and the top ends of the edge plates 220 slide along an inner end of the gap. During specific use, the top ends of the edge plates 220 slide along the gap between the top plates 120 and the top end of the fixed box 110 during sliding, such that the top ends of the edge plates 220 are subjected to limiting treatment through the gap, to prevent the edge plates 220 from separating from the top of the fixed box 110 due to a great sliding range.

Since the sides of the edge plates 220 are in frequent contact with the inner walls of the top plates 120 during a process of sliding along the inner end of the gap, in the long run, the contact surface between the edge plates 220 and the top plates 120 will be worn, to affect their service life. Furthermore, both sides of the inner end of each of the top plates 120 are provided with a pair of buffer springs 121, of which tail ends are connected with the sides of the edge plates 220. The top plates 120 are protected through the set buffer springs 121, during a sliding process, the edge plates 220 will drive the buffer spring 121 on one side to stretch and drive the buffer spring 121 on the other side to compress, when both the buffer springs 121 on the two sides are in a maximum limit, the edge plates 220 cannot continue to move at this time, so a certain buffer effect is achieved to the sliding of the edge plates 220, to prevent a collision occurred between the edge plates 220 and the inner walls of the top plates 120 due to the great sliding range.

The basic principles, main characteristics and advantages of the present disclosure are shown and described above. Those skilled in the art shall understand that the present disclosure is not limited by the above embodiments, the above embodiments and specification describe the preferred embodiments of the present disclosure merely, are not intended to limit the present disclosure. Various changes and improvements will be made without deviating from the spirit and scope of the present the disclosure, and all of these fall within the scope of protection of the present disclosure. The scope of protection of the present disclosure is defined by the appended claims and their equivalents.

What is claimed is:

1. A production device for preparing a building material using a fine particle silt in iron tailings, comprising an operation desk, wherein the operation desk comprises a fixed box, a through groove is formed in a bottom of an inner end of the fixed box, a grinding device is arranged at the inner end of the fixed box and comprises a grinding cabinet, a plurality of leakage grooves are formed in a bottom end of the grinding cabinet and keep communicating with the through groove, both sides of the grinding cabinet are provided with edge plates, the two edge plates keep a sliding connection with both sides of a top end of the fixed box in respective, a side groove is formed in a side of each of the edge plates, a plurality of toothed grooves are formed in a top wall of the side groove, a plurality of grinding assemblies are arranged inside each of the edge plates, each of the grinding assemblies comprises a connecting shaft, both sides of which keep a sliding connection with both sides of the side groove in respective and keep a rotating connection with both sides of each of the edge plates in respective, a plurality of grinding balls are serially connected on the connecting shaft, both ends of the connecting shaft are coaxially connected with gears, the gears keep meshing with the toothed grooves, both sides of the fixed box are provided with hydraulic rods, and tail ends of the hydraulic rods are connected with bottom ends of the edge plates;

both sides of the inner end of the fixed box are provided with baffles which keep a sliding connection with the grinding cabinet, and keep a rotating connection with various connecting shafts;

a wedge block is arranged at an inner end of the through groove, and two tilted grooves are formed between the wedge block and the through groove;

a base plate is arranged at a middle position of a top end of the wedge block, a top groove is formed in a top end of the base plate, and a plurality of burrs are arranged at an inner end of the top groove;

an arc-shaped groove is formed in a contact position between the bottom end of each of the edge plates and the top end of the fixed box, and an inner end of the arc-shaped groove is in rolling connection with a plurality of balls which keep a rolling connection with the top end of the fixed box;

both sides of the top end of the fixed box are provided with top plates, a gap is reserved between the top plates and the top end of the fixed box, and the top ends of the edge plates slide along an inner end of the gap; and both sides of the inner end of each of the top plates are provided with a pair of buffer springs, of which tail ends are connected with the sides of the edge plates.

2. The production device for preparing the building material using the fine particle silt in the iron tailings according to claim 1, wherein both sides of a bottom end of the through groove are provided with collecting cabinets, of which top ends are provided with collecting grooves, the collecting grooves keep communicating with the bottom end of the through groove, bottom ends of the collecting cabinets are provided with sliders which keep a sliding connection with the bottom end of the fixed box, and sides of the collecting cabinets are provided with handles.

3. The production device for preparing the building material using the fine particle silt in the iron tailings according to claim 1, wherein both sides of the top end of the grinding cabinet are provided with shields, and both shields are inclined to the middle position of the grinding cabinet.

* * * * *